3,210,320
VINYL RESINS STABILIZED WITH AN ALKYLENE OXIDE AND THE REACTION PRODUCT OF AN ALIPHATIC DIOL AND AN AROMATIC DICHLOROPHOSPHINE
James S. F. Huhn and Francis J. Sheets, Charleston, W. Va., assignors to Union Carbide Corporation, a corporation of New York
No Drawing. Filed Oct. 29, 1962, Ser. No. 233,924
3 Claims. (Cl. 260—45.8)

This application is a continuation-in-part of copending application, Serial No. 11,140, filed February 26, 1960, now U.S. Patent 3,061,583.

The present invention relates to stabilized vinyl resin compositions and to methods for their preparation. More particularly, the invention is concerned with the production of stabilized vinyl resin solutions which evidence improved resistance to discoloration when subjected to the action of heat.

Vinyl resins are in general well known to the art and find use in a number of diverse applications. Noteworthy among such uses is the role vinyl resins play in the manufacture of synthetic fibers. It is also well known that vinyl resins are sensitive to heat as manifested by discoloration. Thus, for example, in the production of synthetic fibers from vinyl resins, the resin is ordinarily dissolved in a suitable inert organic solvent by means of heat and thereafter maintained in solution at elevated temperatures for prolonged periods of time during which fiber spinning operations are conducted. As a consequence of these and other procedures involving the heating of a vinyl resin solution, the color of the solution has often been found to undergo a progressive yellowing or darkening. In turn, this discoloration has been found to engender an undesirable initial color in the fibers or other articles produced from the heated vinyl resin solution. It has therefore become customary to incorporate in vinyl resin solutions small amounts of stabilizing materials for the purpose of retarding or inhibiting the discoloration which would otherwise occur upon the application of heat.

Among the compounds heretofore employed as stabilizers for vinyl resin solutions are the polymeric organophosphines produced by the reaction of a saturated aliphatic polyol containing from 2 to about 8 carbon atoms with an aromatic dichlorophosphine of the formula

wherein R designates either a phenyl or phenoxy radical.

The incorporation of stabilizing quantities of such polymeric organophosphines in vinyl resin solutions has been found to contribute appreciably to the minimization of discoloration in such solutions upon exposure to the action of heat and represents a significant improvement over the use of many other, conventional stabilizers. In large-scale commercial fiber-spinning operations, however, some variability in the stabilizing efficiency of the polymeric organophosphines has been encountered. While the precise cause or causes of this variability is at present unknown, several conditions are believed to constitute underlying factors in this respect. One such condition is the exposure of the vinyl resin solution to high temperatures for considerable periods of time, thus taxing the stabilizing capacity of the polymeric organophosphine. Another condition which may affect the efficiency of the polymeric organophosphine as a stabilizer to some extent is the presence of water in the vinyl resin solution even in amounts as small as those commonly introduced as an impurity with the organic solvent for the resin. In this connection, by way of illustration, discoloration of the vinyl resin solution containing the polymeric organophosphine has been found to progress somewhat more rapidly upon heating when water is also present therein. A third condition which may engender some variation in the effectiveness of the polymeric organophosphine as a stabilizer for vinyl resin solutions is the exposure of the polymeric organophosphine to moist air during storage precedent to its use as a stabilizer. Such storage has, for instance, often been found to reduce the efficiency of a given initial quantity of polymeric organophosphine when subsequently employed as a stabilizer.

Unexpectedly, it has now been discovered that improved stabilizer compositions for use in conjunction with the stabilization of vinyl resin solutions are obtained by the addition to or incorporation with the polymeric organophosphine hereinabove described of a lower alkylene oxide having a boiling point below 200° C. at atmospheric pressure. The alkylene oxide is preferably admixed with the polymeric organophosphine as soon as possible after production of the latter compound and prior to any prolonged exposure of the polymeric organophosphine to moisture. This mixture is subsequently incorporated in the vinyl resin solution in accordance with conventional stabilization techniques. In this manner, a maximum stabilizing effect can be achieved. However, improved results also accrue in accordance with this invention by the simultaneous or consecutive introduction of the polymeric organophosphine and the alkylene oxide to the organic solvent employed either prior, to, during, or subsequent to the dissolution of the vinyl resin in the organic solvent. Moreover, under such circumstances, the introduction of the stabilizer combination is preferably made prior to both the dissolution of the vinyl resin and any heating step.

Through the practice of this invention it is possible to prepare vinyl resin solutions which are nearly colorless initially and which demonstrate improved resistance to discoloration upon heating even for prolonged periods of time. The fibers produced from such stabilized resin solutions have a very high degree of whiteness and are, in turn, more suitable for use in the textile field. Moreover, due to the incorporation of an alkylene oxide with a polymeric organophosphine as herein described, the stabilized vinyl resin solutions of this invention uniformly demonstrate a greater resistance to discoloration upon prolonged heating than do stabilized vinyl resin solutions containing only the polymeric organophosphine as a stabilizer. Further, the stabilization of vinyl resin solutions in accordance with this invention advantageously is not affected to any substantial extent by the conventional presence of minor amounts of water, e.g. up to about 7 weight percent based upon the weight of the organic solvent employed or slightly higher, and is similarly unaffected by the previous exposure of the polymeric organophosphine to moist air when the latter is in admixture with the alkylene oxide.

In particular, the vinyl resins contemplated by this invention are those of the type prepared by the homopolymerization of acrylonitrile or by the copolymerization thereof with either vinyl chloride, vinylidene chloride or both. The preferred vinyl resins are those copolymers of acrylonitrile with either vinyl chloride and/or vinylidene chloride containing from about 35 to about 85 weight percent of acrylonitrile polymerized therein. It is to be noted in this respect that the term "copolymer," as employed herein, is meant to include terpolymer. Similarly, the term "copolymerization" is meant to define the polymerization of two or more different monomers.

The polymeric organophosphines of this invention are, as herein described, produced by the reaction of a saturated aliphatic polyol with an aromatic dichlorophosphine, viz. either phenyldichlorophosphine or phenoxydichlorophosphine. This reaction is generally carried out at a temperature of from about −10° C. to about 100° C., and preferably, at a temperature of from about 0° C. to about 50° C. During the course of the reaction, hydrogen chloride is also produced as a by-product, and is ordinarily and preferably removed from contact with both the reactants and the polymeric organophosphine product as rapidly as it is formed.

The actual structure of the polymeric organophosphines produced as herein described will depend for the most part upon the ratio in which the reactants are employed. Thus, for example, upon the utilization of the aromatic dichlorophosphine in a substantial excess over an equimolar proportion with respect to the preferred polyol reactant, i.e., a saturated aliphatic diol, especially in proportions greater than 2 up to about 4 or more moles of the phosphine per mole of the diol, the polymeric organophosphine obtained is predominantly the dimer having a structure corresponding the general formula:

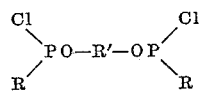

wherein R is as defined above and R′ designates a divalent radical residue derived from the diol reactant and which is otherwise identical in structure therewith save for the exclusion of the hydroxyl radicals of the diol. Such a product, it can be seen, is produced by the reaction involving only one of the chlorine atoms of each molecule of the phosphine reactant and entails the evolution of hydrogen chloride. Alternatively, when the reactants are employed in more nearly equimolar proportions, e.g., in a proportion of less than about 2 moles of the phosphine per mole of the diol, or when the diol is utilized in an excess over an equimolar proportion with respect to the phosphine, the predominant products thus obtained is the more viscous liquid linear polymer having a structure corresponding to the general formula:

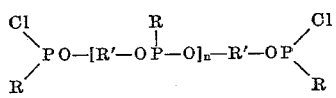

wherein R and R′ are as defined above and $n$ represents an integer having a value of from 1 to about 8 or even higher. Such a product is produced by the reaction of both of the chlorine atoms of each molecule of the phosphine reactant wtih the exception of the chain-terminating molecules, of which only one chlorine atom undergoes reaction. Thus, while efficient polymeric organophosphines which are useful in accordance with this invention are obtained by employing the reactant in a phosphine to diol ratio of from about 0.3 mole to about 5 moles of the phosphine, and preferably from about 0.5 mole to about 2 moles of the phosphine per mole of the diol, proportions outside this range can also be employed, albeit the efficiency of the reaction may thereby be reduced. The proportion in which the reactants are employed need only be sufficient to produce a polymeric organophosphine which is soluble in the vinyl resin solutions contemplated by this invention, such proportions being readily ascertainable by one skilled in the art in light of this disclosure. Similar considerations also hold true when other polyols are employed as a reactant instead of the diols used above for illustrative purposes.

Moreover, it is to be noted that in any given reaction between the aromatic dichlorophosphine and, for example, a saturated aliphatic diol, both the dimer and the higher molecular weight polymers described above may be obtained as products, and that each are effective as heat stabilizers for vinyl resin solutions. The dimer and the higher molecular weight polyols can, if desired, be mutually separated subsequent to their production by conventional techniques such as by the fractional distillation of the crude reaction product or by any other convenient method. However, their mutual separation is in no way essential to their use in accordance with this invention.

The saturated aliphatic polyols which can be reacted with an aromatic dichlorophosphine to produce the polymeric organophosphines contemplated by this invention include the saturated aliphatic diols, particularly the alkylene glycols, such as ethylene glycol, propylene glycol, 1,2-butanediol, 1,4-butanediol, 1,5-pentadiol, 1,8-octanediol, etc. Also included in this regard are the alkylene glycol ethers, e.g., the di-, tri-, and polyoxyalkylene glycols, such as diethylene glycol, triethylene glycol, dipropylene glycol, etc. Suitable polymeric organophosphines can also be obtained by the reaction of an aromatic dichlorophosphine with a saturated aliphatic polyol, and particularly a saturated aliphatic hydrocarbon polyol, containing 3, 4, or more hydroxyl radicals per molecule, such as 1,2,6-hexanetriol, pentaerythritol, etc. The preferred polyol reactants are the diols, such as the alkylene glycols and alkylene glycol ethers, particularly those containing from 4 to 6 carbon atoms. It is also preferred that the hydroxyl radicals of the polyols be separated by at least 4 carbon atoms since the formation of cyclic products upon reaction with an aromatic dichlorophosphine is thereby substantially precluded.

In order to facilitate the removal of the hydrogen chloride formed during the course of the reaction from contact with both the reactants and the polymeric organophosphine product, a compound with which hydrogen chloride will form a readily separable salt is also generally included in the reaction mixture in an amount sufficient to take up all of the hydrogen chloride produced. Organic tertiary amines, including aliphatic aromatic and heterocyclic tertiary amines, are eminently suited for use in this respect. Illustrative of these are compounds such as triethylamine, tributylamine, tribenzylamine, pyridine, and the like. The preferred organic tertiary amines are those such as pyridine and triethylamine which are liquid under the reaction conditions employed, but which form solid, filterable salts with hydrogen chloride. Any other convenient method for removing the hydrogen chloride as it is formed, however, can also be employed.

In addition, the reaction is generally, although not necessarily, carried out in the presence of an inert hydrocarbon diluent such as benzene, toluene, diethyl ether, or the like. The use of such a diluent is particularly expedient when a bulky hydrochloride salt is formed during the course of the reaction.

The reaction is preferably allowed to proceed to completion as evidenced by a cessation in the formation of hydrogen chloride. Shorter reaction periods can also be employed, although ordinarily accompanied by reduced product yields. The crude reaction product is then filtered or otherwise treated to remove any hydrochloride salt present, and thereafter stripped to remove any unreacted material as well as any diluent present. To this end, good results can be obtained, for example, by stripping the crude reaction product up to about the boiling point of the polyol reactant under substantially reduced pressure. The polymeric organophosphine product thus obtained is thereafter utilizable in accordance with this invention.

The lower alkylene oxides employed in combination with the aforementioned polymeric organophosphines in the practice of this invention are the 1,2- and 1,3-alkylene oxides containing from 2 to 4 carbon atoms. The use of these lower alkylene oxides in combination with polymeric organophosphines as herein described permits the realization of improved stability for vinyl resin solutions. Moreover, it has been found that the lower alkylene oxides are generally removed in substantial part from the vinyl resin environment during subsequent procedures such as by extraction in connection with fiber spinning operations and are therefore not present to any substantial extent in the articles produced from the stabilized vinyl resin solutions. The reduced quantity of alkylene oxide in the solid vinyl resin products is desirable since the presence of larger, stabilizing quantities ordinarily may have an unwanted plasticizing effect upon the product. Therefore, the use of higher alkylene oxides which can not readily be removed from the vinyl resin environment upon subsequent utilization of the stabilized vinyl resin solutions is generally to be avoided in accordance with this invention.

Among the suitable alkylene oxides there can be mentioned: ethylene oxide, 1,2-propylene oxide, 1,2-butylene oxide, 1,3-butylene oxide, etc., of which 1,2-propylene oxide is preferred.

Of the organic solvents which can be used to solvate the vinyl resin, particularly good results can be obtained using acetonitrile, acetone, the N,N-dialkylformamides and acetamides, ethylene carbonate and cyclohexanone. However, any other inert organic solvent for the vinyl resin which will not react with the stabilizer employed or with the resin itself can also be used.

The concentration of the polymeric organophosphine incorporated in the vinyl resin solution in accordance with this invention can vary broadly. Preferably, concentrations of at least one polymeric organophosphine effecting the presence in the vinyl resin solution of from about 0.01 to about 1 weight percent of phosphorus based upon the weight of the vinyl resin are employed, with especially good results realizable using concentrations effecting the presence of from about 0.05 to about 0.3 weight percent of phosphorus based upon the weight of the resin. Somewhat higher or lower concentrations of the polymeric organiphosphine can also be employed effectively.

The concentration of the lower alkylene oxide employed in combination with the polymeric organophosphine can also vary broadly, with good results attainable using concentrations of from about 0.2 to about 5 weight percent of at least one alkylene oxide based upon the weight of the vinyl resin. Again, slightly higher or lower concentrations may also be employed effectively. The preferred concentration range in this connection is from about 1 to about 3 weight percent of the alkylene oxide based upon the weight of the vinyl resin.

Upon the addition or incorporation of the stabilizer combination as herein described, the stabilized vinyl resin solutions of this invention can be used in any conventional manner or operation, and evidence improved resistance to discoloration upon heating.

The invention is illustrated further by reference to the following examples of its practice but is not intended to be limited thereby.

*Example I*

To a kettle equipped with a stirrer and thermometer, there were charged 312 grams of 1,5-pentanediol (3 moles), 478 grams of pyridine and 750 cubic centimeters of benzene. The mixture was stirred and cooled to a temperature of 9° C. Thereupon, 537 grams of phenyldichlorophosphine (3 moles) were slowly added to the mixture in the kettle with continued stirring. An exothermic reaction ensued at a temperature maintained by continued cooling in the range of from 9° C. to 36° C. During the course of the reaction, a pyridine hydrochloride precipitate was formed. The reaction was continued until the evolution of hydrogen chloride, as indicated by the formation of the pyridine hydrochloride precipitate, virtually ceased. An additional 375 cubic centimeters of benzene were then added to the crude reaction product, and the product was filtered to remove the precipitate present. Thereafter, the filtered crude reaction product was vacuum-stripped up to a temperature of 150° C., under a reduced pressure of 4 millimeters of mercury. In this manner, 525 grams of a polymeric phenyldichlorophosphine-1,5-pentanediol reaction product were recovered as a light yellow liquid residue or distilland. Analysis showed the product to have a phosphorus content of 14.5 percent by weight, a refractive index ($n_D^{30}$) of 1.5629, and a viscosity of 77,000 centipoises at a temperature of 25° C.

*Example II*

In the manner and using equipment similar to that described in Example I, 98 grams of phenoxydichlorphosphine (0.5 mole) and 53 grams of diethylene glycol (0.5 mole were reacted in initial admixture with 95 grams of pyridine and 250 cubic centimeters of benzene at a temperature maintained in the range of from 10° C. to about 20° C. The reaction was continued until the evolution of hydrogen chloride, as indicated by the formation of a pyridine hydrochloride precipitate, virtually ceased. Thereafter, the crude reaction product was filtered and subsequently vacuum-stripped up to a temperature of 100° C., under a reduced pressure of 5 millimeters of mercury. In this manner, 106 grams of a phenoxydichlorophosphine-diethylene glycol reaction product were recovered as a water-white liquid residue or distilland. Analysis showed the product to have a phosphorus content of 13.5 percent by weight and a viscosity of 31,000 centipoises at a temperature of 25° C. The product was insoluble in water, but soluble in acetonitrile and acetone.

*Example III*

In a series of experiments, 150 grams of acetone were introduced into each of two one-inch pressure bottles and cooled by placing the bottles in an acetone-"Dry Ice" bath for about 30 minutes or until the temperature of acetone reached approximately −20° C. To one bottle, 1 gram of the phenyldichlorophosphine-1,5-pentanediol reaction product of Example I was then added after exposure of the reaction product to the atmosphere for a period of about 18 hours. To another bottle, a mixture of 1 gram of the same reaction product and 1 gram of 1,2-propylene oxide was added after exposure of the mixture to the atmosphere for a period of about 18 hours. Thereafter, to each of the bottles there were added 50 grams of a copolymer resin of vinyl chloride (60 percent) and acrylonitrile (40 percent) having a molecular weight such that the specific viscosity of a 0.2 percent solution of the copolymer in cyclohexanone at a temperature of 20° C. was about 0.26. The bottles were placed in a steam bath at a temperature of about 50° C. for a period of about 30 minutes to effect solvation of the resin. Heating was then continued at a temperature of 80° C. for a period of 2 hours, whereby a clear resin solution was obtained containing 25 percent solids and suitable for the spinning of synthetic fibers. Finally, the color of the resin solutions were determined quantitatively by measuring the transmission of light at a wave length of 430 millimicrons through a solution containing 4 percent resin and 12 percent acetone by weight, and prepared by weighing out approximately 5 grams of the resin solution into a two-ounce glass vial and adding thereto a volume of dimethyl formamide which in cubic centimeters was equal to 5.3 times the weight of the resin solution in grams. Calculated in this manner, the light transmission through the resin solution containing the stabilizer of this invention, i.e. the combination of the polymeric phenyldichlorophosphine - 1,5 - pentanediol reaction product and 1,2-propylene oxide was 81 percent, while the resin solution containing only the phenyldichlorophosphine - 1,5 - pentanediol reaction product showed considerably more color development as evidenced by a light transmission of only 76 percent. The improved effectiveness of the stabilizer of this invention is also evidenced upon prolonged heating of the resin solutions. In similar manner, the effectiveness of the polymeric organophosphine reaction product of Example II is enhanced by use in admixture with 1,2-propylene oxide.

What is claimed is:

1. A stabilized vinyl resin solution comprising (a) an inert organic solvent solution of a vinyl resin copolymer of acrylonitrile with at least one member selected from the group consisting of vinyl chloride and vinylidene chloride, said vinyl resin coplymer containing from about 35 to about 85 weight percent of acrylonitrile polymerized therein; (b) a polymeric organophosphine produced by heating a saturated aliphatic diol selected from the group consisting of the alkylene glycol and alkylene glycol ethers containing from 2 to 8 carbon atoms with an aromatic dischlorophosphine of the formula:

wherein R is selected from the group consisting of the phenyl and phenoxy radicals, at a temperature of from about —10° C. to about 100° C., and in a proportion of from about 0.3 to about 5 moles of said aromatic dichlorophosphine per mole of said saturated aliphatic diol, said polymer organophosphine effecting the presence in said vinyl resin solution of from about 0.01 to about 1 weight percent of phosphorus based upon the weight of said vinyl resin; and (c) a lower alkylene oxide containing from 2 to 4 carbon atoms, in a concentration of from about 0.2 to about 5 weight percent base upon the weight of said vinyl resin.

2. The stabilized vinyl resin solution according to claim 1 wherein the aromatic dichlorophosphine is phenyldichlorophosphine, the saturated aliphatic diol is 1,5-pentanediol, and the lower alkylene oxide is 1,2-propylene oxide.

3. The stabilized vinyl resin solution according to claim 1 wherein the aromatic dichlorophosphine is phenoxydichlorophosphine, the saturated aliphatic diol is diethylene glycol, and the lower alkylene oxide is 1,2-propylene oxide.

No references cited.

MURRAY TILLMAN, *Primary Examiner.*

LEON J. BERCOVITZ, *Examiner.*